United States Patent
Chen et al.

(10) Patent No.: US 9,947,480 B2
(45) Date of Patent: Apr. 17, 2018

(54) ELECTROLYTE MATERIAL FORMULATION, ELECTROLYTE MATERIAL COMPOSITION FORMED THEREFROM AND USE THEREOF

(71) Applicants: ETERNAL MATERIALS CO., LTD., Kaohsiung (TW); GEMMY ELECTRONIC CO., LTD., Taipei (TW)

(72) Inventors: Shinn-Horng Chen, Kaohsiung (TW); Chieh-Fu Lin, Taipei (TW)

(73) Assignees: Eternal Materials Co., Ltd., Kaohsiung (TW); Gemmy Electronic Co., Ltd., Taipei (TW)

( * ) Notice: Subject to any disclaimer, the term of this patent is extended or adjusted under 35 U.S.C. 154(b) by 0 days.

(21) Appl. No.: 15/135,720

(22) Filed: Apr. 22, 2016

(65) Prior Publication Data
US 2016/0240321 A1     Aug. 18, 2016

Related U.S. Application Data

(62) Division of application No. 13/717,984, filed on Dec. 18, 2012.

(30) Foreign Application Priority Data

Dec. 30, 2011  (TW) .............................. 100150078 A

(51) Int. Cl.
C08F 283/10         (2006.01)
H01G 9/028         (2006.01)
(Continued)

(52) U.S. Cl.
CPC ........... *H01G 9/028* (2013.01); *H01G 9/0036* (2013.01); *H01G 9/025* (2013.01); *H01G 9/15* (2013.01)

(58) Field of Classification Search
CPC .......... H01G 9/025; H01G 9/028; H01G 9/15; H01G 9/0036
(Continued)

(56) References Cited

U.S. PATENT DOCUMENTS 6,878,491 B1 * 4/2005 Miura ................... C08G 65/14
                                                            429/309
2003/0040578 A1 * 2/2003 Sugo .................... H01M 4/621
                                                            525/100

(Continued)

FOREIGN PATENT DOCUMENTS

JP        4798812 B1 * 10/2011 ............. C08G 61/12
JP     2011228636 A  * 11/2011 ............. H01G 9/028

OTHER PUBLICATIONS

Ishikita et al., JP 2011-228636 A machine translation in English, Nov. 10, 2011.*

*Primary Examiner* — David T Karst
(74) *Attorney, Agent, or Firm* — Ladas & Parry LLP

(57) ABSTRACT

The present invention provides an electrolyte material formulation including:
  (a) a monomer of formula (I)

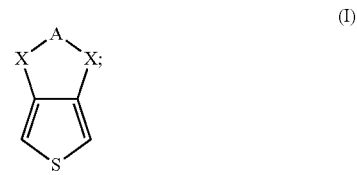

(b) a monomer of formula (II)
(Continued)

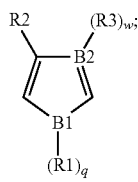

and
(c) a polymerizable compound,
wherein A, X, B1, B2, R1 to R3, q and w are defined as those recited in the specification, and the monomer (b) is in an amount of about 1 part by weight to about 800 parts by weight and the polymerizable compound (c) is in an amount of about 1 part by weight to about 10000 parts by weight based on 100 parts by weight of the monomer (a). The present invention further provides an electrolytic material composition obtained by the polymerization of the aforementioned electrolytic material formulation. The electrolytic material composition can be applied to a solid electrolyte capacitor.

6 Claims, 1 Drawing Sheet

(51) Int. Cl.
*H01G 9/025* (2006.01)
*H01G 9/15* (2006.01)
*H01G 9/00* (2006.01)

(58) Field of Classification Search
USPC .......................................................... 525/529
See application file for complete search history.

(56) References Cited

U.S. PATENT DOCUMENTS

| | | | |
|---|---|---|---|
| 2006/0109604 A1* | 5/2006 | Kawashima | H01G 9/025 361/272 |
| 2007/0129534 A1* | 6/2007 | Ohata | C08G 61/124 528/373 |
| 2011/0135939 A1* | 6/2011 | Isaji | C08G 65/18 428/428 |
| 2011/0233450 A1* | 9/2011 | Nobuta | C08L 79/04 252/62.2 |
| 2011/0233532 A1* | 9/2011 | Sotzing | C25B 3/00 257/40 |
| 2012/0165488 A1* | 6/2012 | Sugihara | H01G 9/028 526/256 |

* cited by examiner

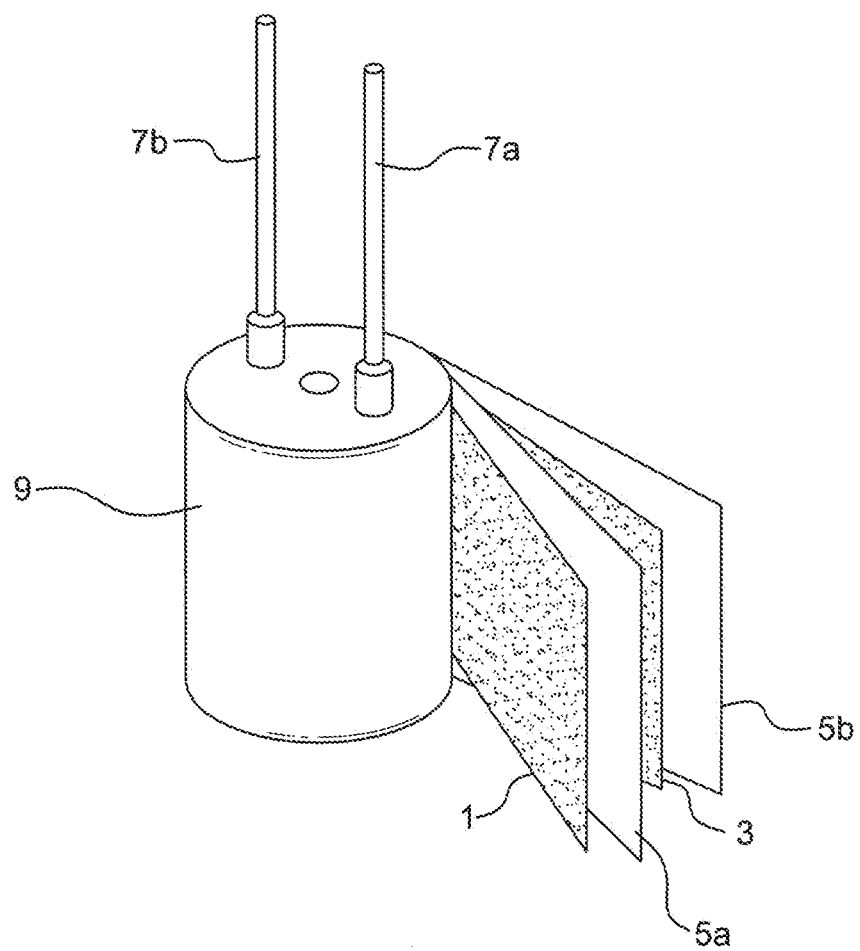

ELECTROLYTE MATERIAL FORMULATION, ELECTROLYTE MATERIAL COMPOSITION FORMED THEREFROM AND USE THEREOF

CROSS REFERENCE APPLICATIONS

This application is a divisional of U.S. patent application Ser. No. 13/717,984 filed 18 Dec. 2012, which claims the benefit of Taiwanese Application No.: 100150078 filed Dec. 30, 2011, the content of which is incorporated herein by reference.

BACKGROUND OF THE INVENTION

Field of the Invention

The present invention relates to an electrolyte material formulation, an electrolyte material composition formed from the electrolyte material formulation, and a solid capacitor using the electrolytic material composition.

Description of the Related Art

Capacitors are a type of electronic elements that are widely used in various electronic products. With advancement in technology development, electronic products are being developed in the direction of miniaturization and light weight, and the capacitors used in electronic products are required to be miniaturized and have a high capacitance and low impedance when being used at a high frequency.

Capacitors may be classified into conventional liquid capacitors and newly developed solid capacitors. In the electrolyte of early-stage aluminum liquid capacitor, a liquid electrolyte is used as a charge transfer substance. The main components of the liquid electrolyte include a high-boiling point alcohol, an ionic liquid, boric acid, phosphoric acid, an organic carboxylic acid, an ammonium, a high-polarity organic solvent, and a small amount of water. The components not only serve as charge transfer substances, but also have the function of patching a dielectric layer of aluminum oxide on an aluminum foil. If the internal aluminum metal is exposed due to defects on the dielectric layer of aluminum oxide, during the charge and discharge process of the capacitor, the electrolyte may react with the exposed aluminum metal and aluminum oxide is generated, thus achieving the patching function. However, although the conventional aluminum liquid capacitor can meet the requirement of high capacitance at a low cost, as the electrolyte used is a liquid, it has the disadvantages of low conductivity and poor high temperature resistance; moreover, in the process of aluminum oxide generation, hydrogen is also generated, and if excessive hydrogen is accumulated in the capacitor, capacitor rupture can easily occur, which will damage the electronic product. Although a hydrogen absorbing agent may be added to the liquid electrolyte to reduce the risk of capacity rupture, the problem is not eliminated.

Accordingly, a new generation of solid capacitor is developed, in which the liquid electrolyte is directly replaced by a solid electrolyte. The solid electrolyte is formed by a conductive polymer. Anions of an oxidant are blended in the structure of the polymer as a dopant and holes are formed, so that the polymer has conductivity. Compared with the liquid electrolyte or a solid organic semiconductor complex salt such as tetracyanoquinodimethane (TCNQ) composite salt and inorganic semiconductor $MnO_2$ used in conventional electrolyte capacitor, the conductive polymer has a high conductivity and a suitable high high-temperature insulation property, so the conductive polymer has propelled the development of the trend of using solid electrolyte in current electrolytic capacitors.

In addition to having long service life that is 6 times longer than that of a common capacitor, the solid capacitor has improved stability and its capacitance is not easily influenced by an ambient temperature and humidity in use. Additionally, the solid capacitor has the advantage of a low ESR, a low capacitance variation rate, an excellent frequency response (high frequency resistance), a high temperature resistance, and a high current resistance, and the problem of leakage and plasma explosion is eliminated. Although conventional liquid capacitor has high capacitance, its application is limited due to a high ESR.

Jesse S. Shaffer et al disclose a method of using a conductive polymer in an electrolyte of an electrolytic capacitor for the first time in U.S. Pat. No. 4,609,971. The method includes immersing an anode aluminum foil of a capacitor in a mixture solution formed by a conductive polymer polyaniline powder and a dopant $LiClO_4$, and then removing a solvent on the aluminum foil. Due to its excessively high molecular weight, polyaniline cannot permeate into micropores of the anode foil, so the impregnation rate of the capacitor obtained through this method is poor, and the impedance is high. Then, in order to enable the polymer to easily permeate into the micropores of the anode foil, Gerhard Hellwig et al disclose a chemical oxidation polymerization method of using a conductive polymer as an electrolyte of a capacitor in U.S. Pat. No. 4,803,596. The method includes respectively immersing a capacitor anode foil in a solution of a conductive polymer monomer and an oxidant, and polymerizing the conductive polymer monomer at a suitable condition, in which the conductive polymer electrolyte is accumulated to a sufficient thickness through multiple immersions. Thereafter, Friedrich Jonas et al of the Bayer Corporation in Germany disclose a method of manufacturing an aluminum solid capacitor with poly-3,4-ethylenedioxythiophene (PEDOT) as an electrolyte by using a monomer 3,4-ethylenedioxythiophene (EDOT) in combination with an oxidant iron (III) p-toluenesulfonate for the first time in U.S. Pat. No. 4,910,645. Moreover, it has been found that 3,4-ethylenedithiathiophene (EDTT) which is structurally related to EDOT can be converted to electroactive polymer (see Lambertus Groenendaal et. Al, Adv. Mater. 2000, 12, No. 7).

The conductive polymer PEDOT has the advantages of a high heat resistance, a high conductivity, a high charge transfer velocity, being non-toxic, a long service life, and no occurrence of capacitor rupture when being applied in a capacitor. Presently, almost all solid capacitor manufacturers use the two materials to manufacture aluminum or tantalum solid capacitor. However, PEDOT on the aluminum foil surface or pores that is polymerized by immersing the capacitor element in a mixture solution containing the monomer EDOT and iron (III) p-toluenesulfonate mostly has a powder structure with a lower polymerization degree, and the physical properties of the powder structure are poor, so the powder structure cannot be easily adhered on the aluminum foil surface or pores as it is more likely to fall off from the surface or pores, and a complete PEDOT polymer structure cannot be easily formed on the aluminum foil surface or pores. Therefore, the stability of the solid capacitor at a voltage of 16 V or higher is poor, resulting in that the solid capacitor cannot be used in the process of a voltage of 16 V or higher, or the yield of the process is low. Moreover, since the powder structure formed by the conductive polymer PEDOT cannot be easily adhered on the aluminum foil pores, when the problem of falling off occurs, the withstandable working voltage is limited.

In Japanese Patent No. 2010-129651, it is disclosed that a capacitor element is directly immersed in a polymer solution containing a polymer PEDOT, and a complete PEDOT polymer structure is formed on an aluminum foil surface or pores, so that a solid capacitor is applicable in a working environment of a voltage of 50 V. However, when compared with conventional process, the cost of the polymer PEDOT material is higher than that of the monomer EDOT; the polymer PEDOT material is difficult to store; and the process needs more time and is more difficult to control.

Accordingly, the industry calls for the development of a solid capacitor that can withstand a higher voltage, such as 50 V or more, has good stability and is priced at a relatively low cost, so as to replace the liquid capacitor in 3C products that require high temperature resistance and high frequency resistance.

SUMMARY OF THE INVENTION

Accordingly, the present invention is directed to an electrolyte material formulation, which comprises:
(a) a monomer of formula (I):

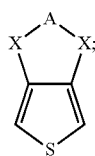

(b) a monomer of formula (II):

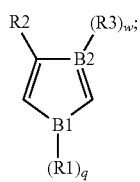

and
(c) a polymerizable compound,
wherein:
A is a $C_{1-4}$ alkylene substituted by $(Rx)_p$:
X is O or S;
B1 is O, S, or N;
B2 is N or C;
R1, R2, R3 and Rx are independently H, unsubstituted or substituted $C_{1-20}$ alkyl or alkoxy, or unsubstituted or substituted $C_{6-20}$ aryl;
p is an integer from 0 to 2; and
q and w are independently an integer of 0 or 1, and
wherein the monomer (b) is in an amount of about 1 part by weight to about 800 parts by weight and the polymerizable compound (c) is in an amount of about 1 part by weight to about 10000 parts by weight based on 100 parts by weight of the monomer (a).

The present invention is further directed to an electrolytic material composition formed from the electrolytic material formulation of the present invention through polymerization.

The present invention is yet further directed to a solid capacitor, which comprises:
an anode;
a dielectric layer formed on the anode;
a cathode; and
a solid electrolyte located between the dielectric layer and the cathode, in which the solid electrolyte comprises the electrolyte material composition according to the present invention.

The electrolyte material composition according to the present invention exhibits a better structural stability, and the solid capacitor manufactured from the electrolyte material composition, with the advantages of easy construction, low cost, and good process stability, thereby has a high withstanding voltage (or called sparkling voltage) and a high capacitance and can be working at 25 V, 35 V, 50 V, 63 V, or a higher voltage.

BRIEF DESCRIPTION OF THE DRAWING

FIG. 1 shows a capacitor element according to an embodiment of the present invention.

DETAILED DESCRIPTION OF THE INVENTION

To have a better understanding about the disclosure herein, some terms are defined as follows.

By the term "about," it means the acceptable deviation of a value determined by a person having ordinary skill in the art, partly depending on how to calculate or determine the value. In some embodiments, the term "about" means within 1, 2, 3, or 4 standard deviations. In yet other embodiments, the term "about" means within 50%, 20%, 15%, 10%, 9%, 8%, 7%, 6%, 5%, 4%, 3%, 2%, 1%, 0.5%, or 0.05% of a given value or range.

By the term "alkyl," it means a straight or branched carbon chain radical. In some embodiments, alkyl is a carbon chain radical having 1 to 20 carbons ($C_{1-20}$), 1 to 15 carbons ($C_{1-15}$), 1 to 10 carbons ($C_{1-10}$), or 1 to 6 carbons ($C_{1-6}$). Examples of alkyl include, but are not limited to, methyl, ethyl, propyl (including all the isomer forms), n-propyl, isopropyl, butyl (including all the isomer forms), n-butyl, isobutyl, tert-butyl, pentyl (including all the isomer forms), and hexyl (including all the isomer forms).

By the term "alkylene," it means an optionally substituted, divalent, straight or branched carbon chain radical. In some embodiments, alkylene is a carbon chain radical having 1 to 4 carbons ($C_{1-4}$). Examples of alkylene include, but are not limited to, methylene, ethylene, propylene (including all the isomer forms), n-propylene, isopropylene, butylene (including all the isomer forms), n-butylene, isobutylene, and tert-butylene.

By the term "alkoxy," it means an alkyl as described above that is attached with an oxygen atom. Examples of alkoxy include, but are not limited to methoxy, ethoxy, propoxy, n-propoxy, 2-propoxy, n-butoxy, iso-butoxy, tert-butoxy, cyclohexyloxy, phenoxy, benzyloxy, and 2-naphthoxy.

By the term "aryl," it means mono-cyclic or multi-cyclic, monovalent aromatic radical. In some embodiments, an aryl has 6 to 20 ($C_{6-20}$), 6 to 15 ($C_{6-15}$), or 6 to 10 ($C_{6-10}$) ring atoms. Examples of aryl include, but are not limited to, phenyl, naphthyl, fluorenyl, azulenyl, anthracyl, phenanthryl, pyrenyl, biphenyl, and terphenyl. It also means a bicyclic or tricyclic carbon ring, one of whose rings is an aromatic ring and the other one or two rings can be saturated, partially unsaturated, or aromatic rings, such as dihydronaphthyl, indenyl, dihydroindenyl, and tetrahydronaphthyl.

Some embodiments according to the present invention will be illustrated as follows. However, without departing from the spirit of the invention, the invention also encompasses various practical embodiments and should not be construed to be limited to those described in the specification. Moreover, unless otherwise described, "a," "an," or "the" or the like will represent singular or plural form. The term "substituted" represents that a hydrogen is replaced by a substituent, and said substituent can be any group or element other than hydrogen. In addition, for the sake of clarity, the sizes of the elements and regions shown in the drawing can be magnified, rather than being drawn according to the actual proportion.

The present invention pertains to an electrolyte material formulation comprising (a) a monomer of formula (I), (b) a monomer of formula (II), and (c) a polymerizable compound.

The monomer (a) used in the present invention has the structure of the following formula (I):

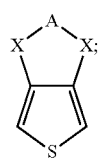
(I)

wherein A is a $C_{1-4}$ alkylene substituted by $(Rx)_p$ and X is O or S, where Rx are independently H, unsubstituted or substituted $C_{1-20}$ alkyl or alkoxy, or unsubstituted or substituted $C_{6-20}$ aryl, and p is an integer from 0 to 2.

The monomer (a) preferably includes, but is not limited to

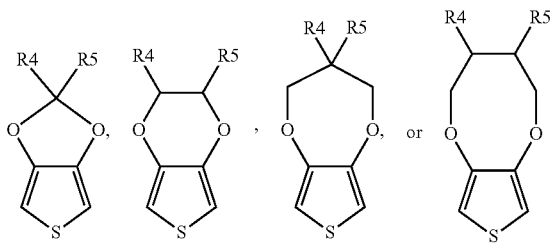

wherein R4 and R5 each independently represent H, unsubstituted or substituted $C_{1-15}$ alkyl or alkoxy, or unsubstituted or substituted $C_{6-15}$ aryl. Preferably, R4 and R5 each independently represent H or $C_{1-3}$ alkyl or alkoxy.

According to an embodiment of the present invention, the monomer (a) is

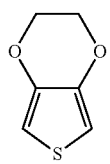

(EDOT),

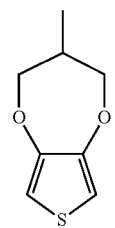

(3-methyl-3,4-dihydro-2H-thieno[3,4-b][1,4]dioxepine), or

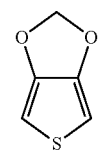

(thieno [3,4-d][1,3]dioxole).

The electrolyte material formulation of the present invention comprises a monomer (b), thereby forming a highly polymerized conductive polymeric structure with the monomer (a). The monomer (b) has the structure of the following formula (II):

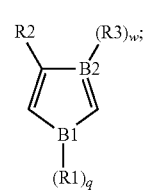
(II)

wherein, B1 is O, S or N; B2 is N or C; q and w each independently represent an integer of 0 or 1; R1, R2 and R3 each independently represent H, unsubstituted or substituted $C_{1-20}$ alkyl or alkoxy, or unsubstituted or substituted $C_{6-20}$ aryl, when B1 being O or S, q being 0; and when B2 being N, w being 0.

The monomer (b) preferably includes, but is not limited to,

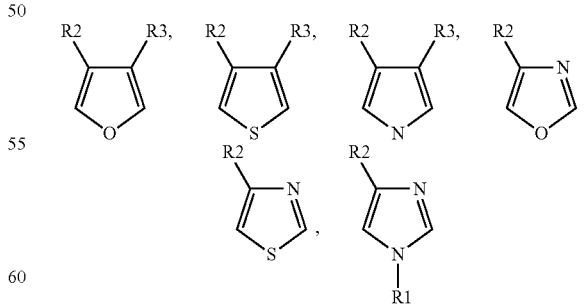

or a combination thereof, wherein R1, R2, and R3 each independently represent H or $C_{1-3}$ alkyl or alkoxy.

According to an embodiment of the present invention, the monomer (b) is

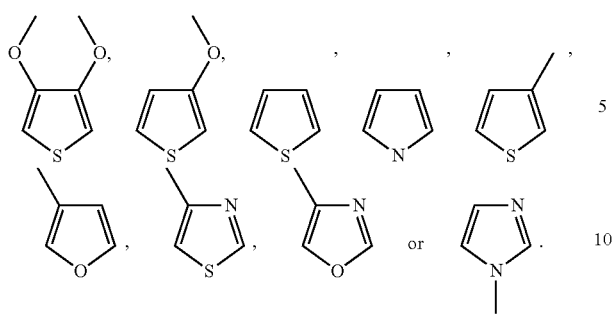

The electrolyte material formulation of the present invention comprises a polymerizable compound (c), thereby forming a second polymer to allow the highly polymerized first polymer polymerized from the monomer (a) and the monomer (b) to be easily adhered on the aluminum foil surface or pores without falling off from the surface or pores. The polymerizable compound (c) used in the present invention is present in the inventive electrolyte material formulation in the form of a monomer, an oligomer, or a combination thereof. The polymerizable compound used in the electrolytic material formulation of the present invention may be an epoxy group-containing polymerizable compound, vinyl-containing unsaturated polymerizable compound, acrylate-containing unsaturated polymerizable compound, or a mixture thereof.

Preferably, the polymerizable compound (c) is selected from the group consisting of:

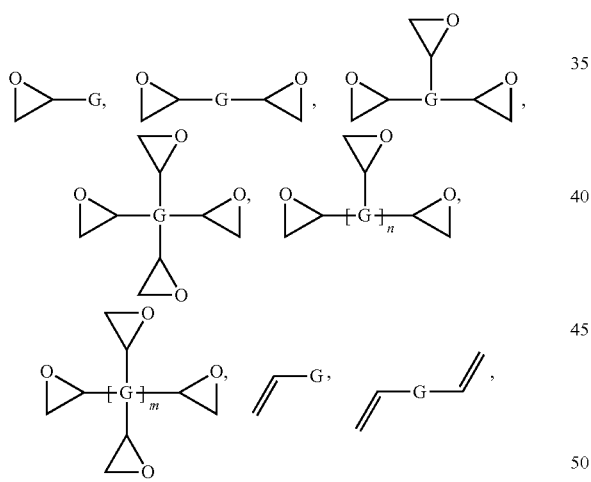

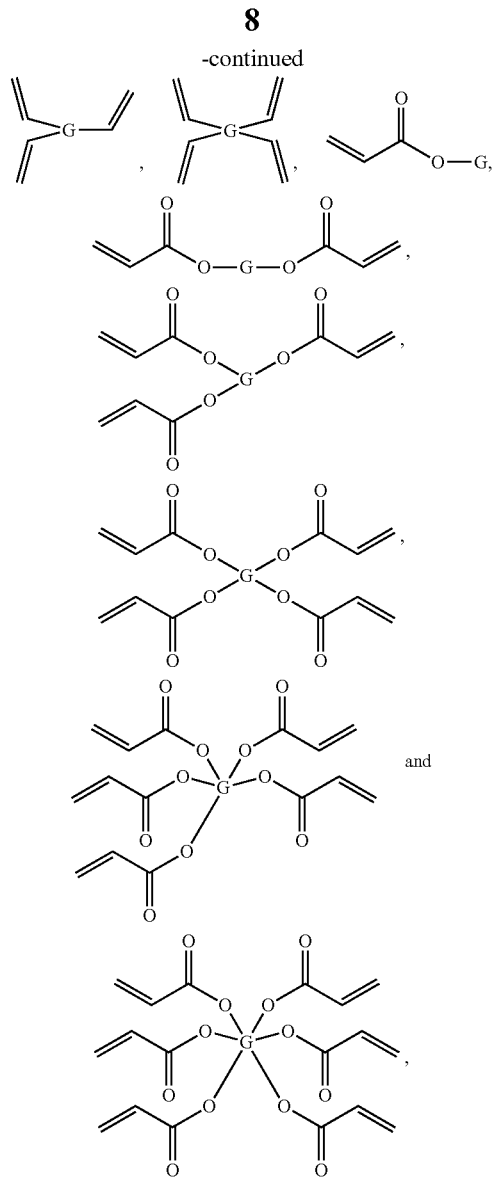

where n is an integer greater than or equal to 3, m is an integer greater than or equal to 2, and G is an organic group, an inorganic group, or a mixture thereof.

According to an embodiment of the present invention, the polymerizable compound is selected from the group consisting of:

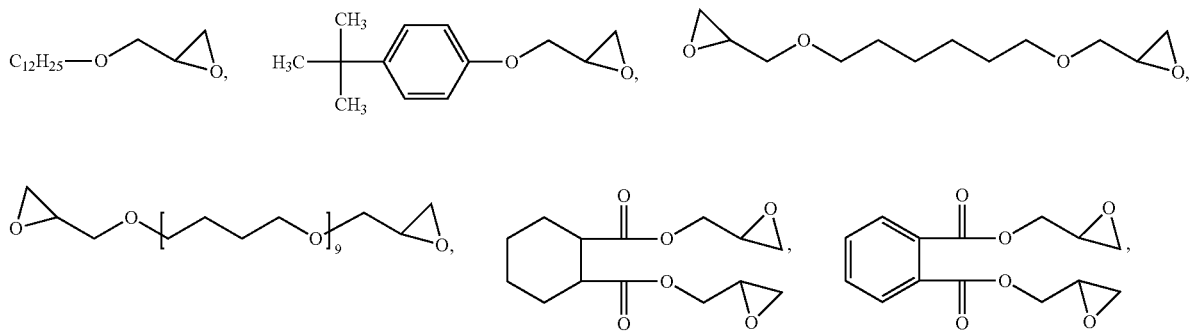

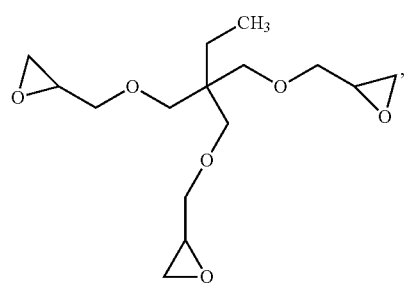
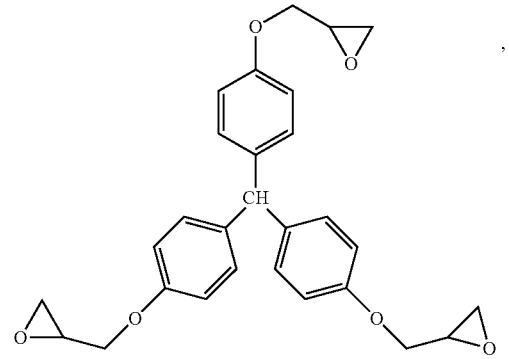
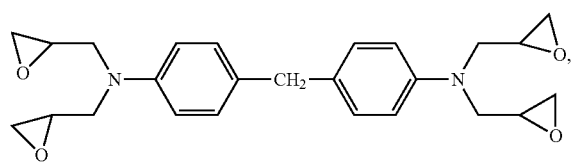
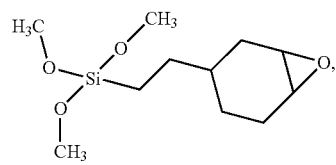
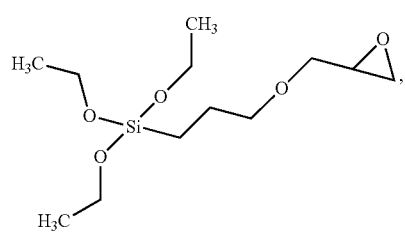
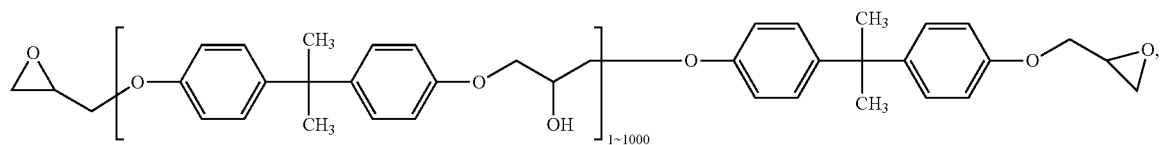
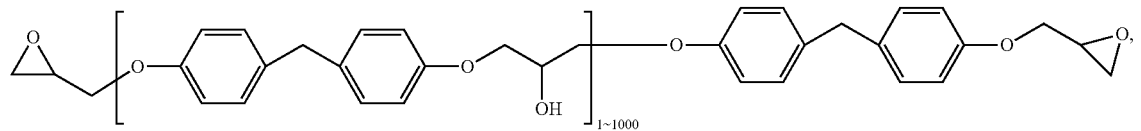
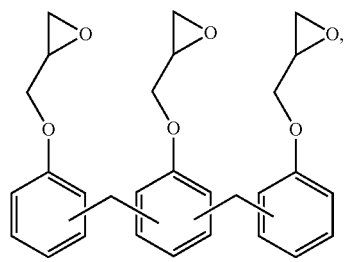

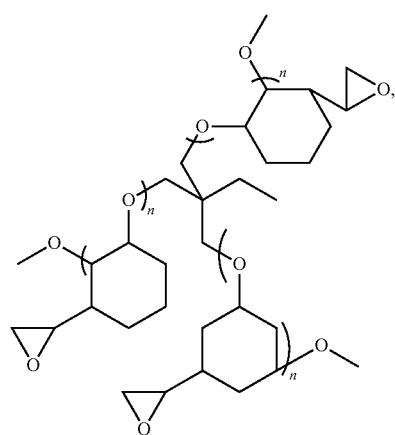
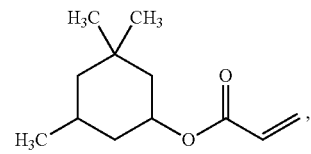
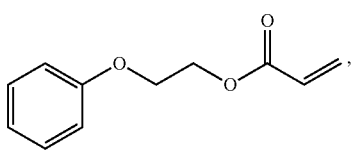
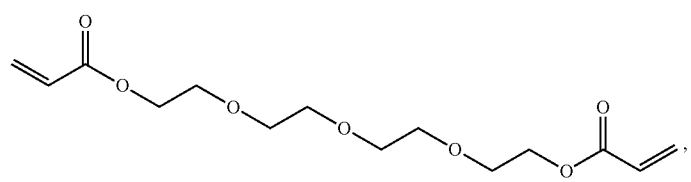
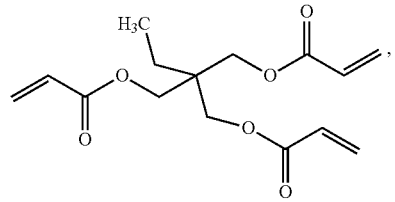
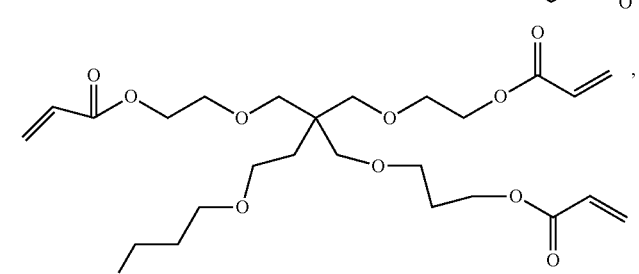
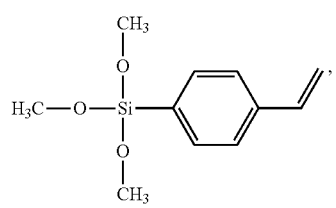
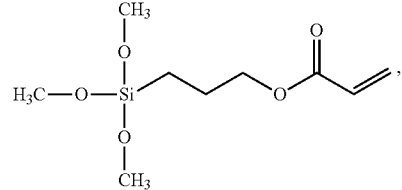
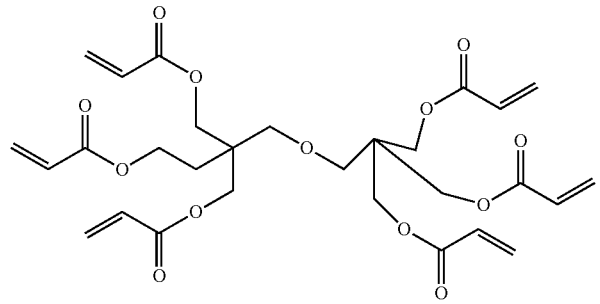
and
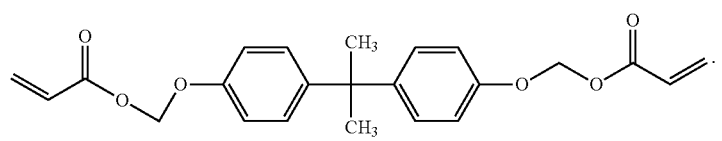

The polymerizable compound (c) has a molecular weight preferably ranging from 40 to 1,000,000, more preferably ranging from 40 to 500,000, and most preferably ranging from 40 to 100,000.

In the electrolyte material formulation of the present invention, the monomer (b) is in an amount of about 1 part by weight to about 800 parts by weight and the polymerizable compound (c) is in an amount of about 1 part by weight to about 10000 parts by weight based on 100 parts by weight of the monomer (a). Preferably, based on 100 parts by weight of the monomer (a), the amount of the monomer (b) is about 5 parts by weight to about 400 parts by weight, and the amount of the polymerizable compound (c) is about 5 parts by weight to about 5000 parts by weight.

The electrolyte material formulation according to the present invention may optionally contain an oxidant, which promotes the formation of the conductive polymer from the monomer (a) and the monomer (b). The oxidants useful in the present invention are known in the art, and can be, for example, alkali metal persulfates, ammonium salts, peroxides, or ferric salts of organic acids, or the combination thereof. Preferably, the oxidant can be iron (III) p-toluenesulphonate, ammonium sulfate, ammonium persulfate, ammonium oxalate, ammonium perchlorate, or hydrogen peroxide or the mixtures thereof. According to an embodiment of the present invention, the oxidant is iron (III) p-toluenesulfonate.

In the electrolyte material formulation of the present invention, based on 100 parts by weight of the total amounts of the monomer (a) and the monomer (b), the amount of the oxidant is preferably about 5 parts by weight to about 3000 parts by weight, more preferably about 100 parts by weight to about 1000 parts by weight, and most preferably about 100 parts by weight to about 300 parts by weight.

The electrolyte material formulation of the present invention can optionally comprise a curing agent. For example, when an epoxy group-containing polymerizable compound is used, a curing agent is added, and upon crosslinking and curing, a three-dimensional network structure is formed. The curing agent useful in the present invention is known in the art, and for example, can be an amine or an acid anhydride, such as,

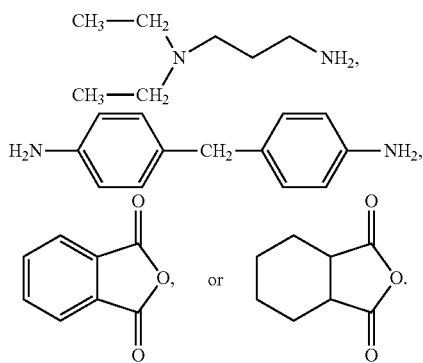

In the electrolyte material formulation of the present invention, the weight ratio of the amount of the curing agent to that of the polymerizable compound (c) is 0 to 2, preferably 0 to 1.5.

In order to accelerate the curing reaction, the electrolyte material formulation of the present invention may further comprise a catalyst. The catalyst useful in the present invention is known in the art, which for example, can be a tertiary amine, an azo compound, or a benzoyl compound. According to an embodiment of the present invention, the useful catalyst includes:

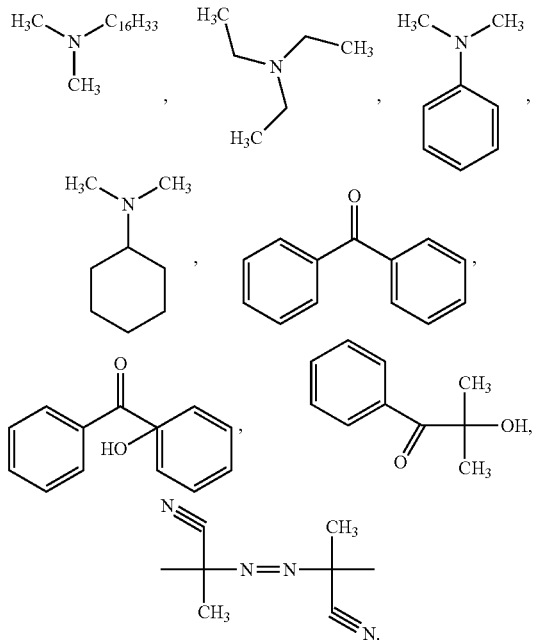

In the electrolyte material formulation of the present invention, the catalyst is used in an amount such that a weight ratio of the catalyst to that of the polymerizable compound (c) is 0.001 to 1, preferably 0.005 to 0.5, and more preferably 0.01 to 0.25.

The present invention also provides an electrolyte material composition formed from the electrolyte material formulation through polymerization, which comprises:
(A) a first polymer, formed from the polymerization units derived from the monomer (a) and the monomer (b); and
(B) a second polymer, formed from the polymerization units derived from the polymerizable compound (c).

The conductive polymer used in conventional solid electrolyte is normally in a lowly polymerized powder-like structure, which is not easy to be adhered on an anode foil surface or pores but likely to fall off from the surface or pores, exhibits a poor stability, and the production yield is low. The electrolyte material composition of the present invention contains a first polymer and a second polymer, and the first polymer and the second polymer do not react with each other.

The first polymer is used as a conductive polymer and exhibits the characteristics of high heat resistance, high conductivity, high charge transfer velocity, being non-toxic, a long service life, and no occurrence of capacitor rupture when being applied in a capacitor. The first polymer is formed from the polymerization of the monomer (a) and the monomer (b) in the presence of an oxidant. The first polymer has a molecular weight ranging from 1000 to 500000, preferably ranging from 1000 to 50000, and more preferably ranging from 1000 to 20000.

The second polymer is used as a polymerizable material, and in order to increase the degree of crosslinking of molecules in polymerization and enable the second polymer to be cured, the second polymer is optionally formed from the polymerization units derived from a polymerizable compound and a curing agent. The network structure of the second polymer will form a thin film to improve the stability of molecular structure of the first polymer, so that the first polymer can be adhered onto a capacitor element without falling off, and is applicable in a high-voltage (a voltage of 16 V or higher) working environment, preferably a working environment of a voltage of 63 V or higher.

The electrolyte material formulation of the present invention is polymerized in a capacitor, and the process pertains to an in situ reaction. The in situ process may be classified into a one-solution method, a two-solution method, and a multiple-solution method. For example, the electrolyte material formulation of the present invention and an oxidant can be formulated into a single solution, or formulated into two solutions including a first solution and a second solution, where the first solution contains the monomer (a), the monomer (b), and the polymerizable compound (c), and the second solution contains the oxidant. The electrolyte material formulation of the present invention can also be formulated into multiple solutions including a first solution, a second solution, and a third solution, where the first solution contains the monomer (a) and the monomer (b), the second solution contains the oxidant, and the third solution contains the polymerizable compound (c). Regardless of the one-solution method, the two-solution method, or the multiple-solution method, a curing agent and a catalyst may be optionally added, where the curing agent and the catalyst are as defined above. In order to adjust the viscosity of the solution, the electrolyte material formulation of the present invention may further contain a solvent. The solvent useful in the present invention is not particularly limited in principle, which for example, can be water, alcohols, or benzenes, or combinations thereof, preferably methanol, ethanol, propanol, n-butanol, tert-butanol, or water, or combinations thereof.

The present invention further provides a solid capacitor, comprising: an anode; a dielectric layer formed on the anode; a cathode; and a solid electrolyte located between the dielectric layer and the cathode, wherein the solid electrolyte comprises the electrolyte material composition mentioned above. The solid capacitor may be an aluminum solid capacitor, a tantalum solid capacitor, or a niobium solid capacitor. Specifically, as the main part of the solid capacitor, the anode is formed by, with an etched conductive metal foil as an anode foil, performing anode oxidation processing on a surface of the anode foil and introducing a wire from the anode foil, and the cathode is formed by, with another metal foil as a cathode foil, introducing a wire from the cathode foil. The dielectric layer is formed from an oxide or the like and is formed on the surface of the anode foil, and is located between the anode foil and the cathode foil. The anode foil and the cathode foil are formed from aluminum, tantalum, niobium, aluminum oxide, tantalum oxide, niobium oxide, titanium plated aluminum, or carbon plated aluminum. The anode foil and the cathode foil are wound into a cylinder, and immersed in the electrolyte material formulation and oxidant in the form of a solution, and after curing treatment (for example, thermal curing or photo curing), a solid electrolyte is formed between the dielectric layer and the cathode foil of the solid capacitor.

After the solid electrolyte is formed in the capacitor element, a solid capacitor may be formed by using conventional technologies and materials. For example, the capacitor element may be installed in a box with a bottom, and a seal element with an opening for exposing the wires may be disposed at the top of the box, and a solid capacitor may be formed after being sealed. The solid capacitor manufactured from the electrolyte material formulation of the present invention exhibits the advantages of easy construction, low cost, high voltage resistance (63 V or higher), high capacitance, and low impedance (35 mΩ or lower).

In the following, methods for manufacturing an electrolyte material composition and a solid capacitor according to an embodiment of the present invention are described with reference to FIG. 1.

FIG. 1 shows a capacitor element according to an embodiment of the present invention. As shown in FIG. 1, an anode foil 1 and a cathode foil 3 and spacer components 5a and 5b that are inserted between the anode foil 1 and the cathode foil 3 are wound together to form a capacitor element 9. Wires 7a and 7b serve as terminals for connecting the cathode foil 3 and the anode foil 1 to an external circuit.

The number of wires connected to the cathode foil and the anode foil is not particularly limited, provided that the cathode foil and the anode foil both are wire connected. The number of the cathode foils and the anode foils is not particularly limited, and for example, the number of the cathode foils may be the same as that of the anode foils, or the number of the cathode foils may be greater than that of the anode foils. The dielectric layer (not shown) formed from an oxide or the like is formed on the surface of the anode foil, and is located between the anode foil and the cathode foil. The anode foil 1, the cathode foil 3, the spacer components 5a and 5b, and the wires 7a and 7b are manufactured by using known materials through known technologies.

Next, the capacitor element is immersed in the electrolyte material formulation in the form of a solution so that a solid electrolyte is formed between the dielectric layer and the cathode foil of the solid capacitor.

The method for forming the solid electrolyte includes, first, as described above, formulating the electrolytic material formulation and an oxidant into a single solution or multiple solutions. If the electrolytic material formulation and the oxidant is formulated into a single solution, the capacitor element 9 is directly immersed in the solution of the electrolytic material formulation and the oxidant; and if the electrolyte material formulation and the oxidant is formulated into two solutions as mentioned above, the capacitor element 9 can be first immersed in the first solution and then immersed in the second solution, or the capacitor element 9 can be first immersed in the second solution and then immersed in the first solution, and thereafter performing polymerization reaction. The polymerization reaction can be performed at a temperature of 25° C. to 260° C., preferably of 85° C. to 160° C. for 1 to 12 hr, preferably 1 to 5 hr, during which time, the monomer (a) first reacts with monomer (b) in the presence of the oxidant to form a conductive polymer. Next, the polymerizable compound is subjected to curing treatment (for example, heat treatment) to form a polymerizable material, and optionally, a curing agent, or catalyst, or a mixture thereof is added in the heat treatment process.

In this way, an electrolyte material composition containing the conductive polymer and the polymerizable material is formed between the dielectric layer of the anode foil and the cathode foil.

The electrolyte material composition containing the conductive polymer and the polymerizable material is formed from the electrolyte material formulation of the present invention upon heat treatment. The polymerizable material can enhance the stability of the structure of the conductive polymer and prevent the anode from being stricken through by leakage current, thereby avoiding short circuit of the solid capacitor. Therefore, the polymerizable material can improve the voltage resistance of the solid capacitor, and can improve the adhesion property of the conductive polymer, so a highly polymerized structure of the conductive polymer can be formed on an electrode surface or pores of the metal foil, and can withstand a higher voltage and has a higher capacitance. Therefore, the solid capacitor can be widely used in industries requiring high-voltage capacitors, for example, drive power supplies for LED lamps, electronic energy-saving lamps and rectifiers, motor electronic devices, computer motherboards, frequency converters, network communications, power supplies for medical devices, and other high-end areas including UPS.

The present invention will be further described by the following examples, which are provided for illustration purposed but not intended to limit the scope of the present invention. Any modifications or alterations that can be easily accomplished by persons skilled in the art fall within the scope of the disclosure of the specification and the appended claims.

EXAMPLES

Example 1

As shown in FIG. 1, a capacitor element 9 was immersed in an electrolyte material formulation formed by mixing 30 g

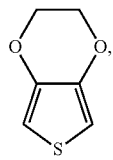

2.6 g

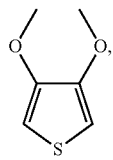

100 g ethanol solution containing 40% iron (III) p-toluene-sulphonate, 20 g polymerizable compound

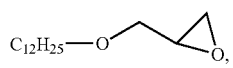

20 g curing agent

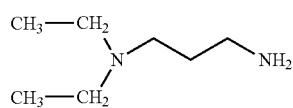

and 2 g catalyst

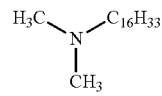

for 5 min. Then, the capacitor element was taken out from the electrolyte material formulation, and subjected to heat polymerization at a temperature in the range of 25° C. to 260° C., so as to form a solid electrolyte containing a mixture of a conductive polymer and a polymerizable material.

Example 2

As shown in FIG. 1, a capacitor element 9 was first immersed in a first solution formed by mixing 30 g

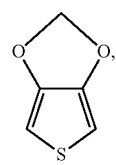

5.3 g

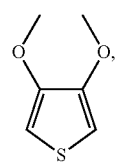

15 g polymerizable compound

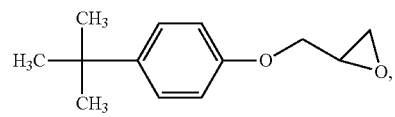

20 g curing agent

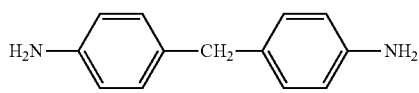 [SMILES: Nc1ccc(Cc2ccc(N)cc2)cc1]

and 2 g catalyst

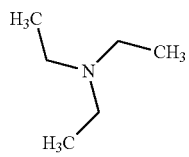

for 5 min, and then immersed in a second solution of 100 g n-butanol solution containing 45% iron (III) p-toluenesulfonate for 5 min. Then, the capacitor element was taken out from the electrolytic material formulation, and subjected to heat polymerization at a temperature in the range of 25° C. to 260° C., so as to form a solid electrolyte containing a mixture of a conductive polymer and a polymerizable material.

Example 3

As shown in FIG. 1, a capacitor element 9 was first immersed in a second solution of 100 g tert-butanol solution containing 50% iron (III) p-toluenesulphonate for 5 min, and then immersed in a first solution formed by mixing 7.9 g

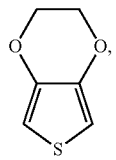

30 g

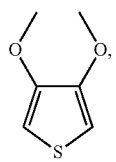

15 g polymerizable compound

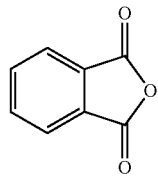

15 g curing agent

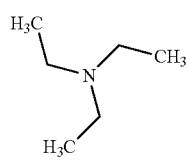

and 2 g catalyst

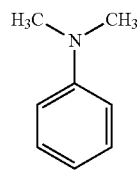

for 5 min. Then, the capacitor element was taken from the electrolytic material formulation, and subjected to heat polymerization at a temperature in the range of 25° C. to 260° C., so as to form a solid electrolyte containing a mixture of a conductive polymer and a polymerizable material.

Example 4

As shown in FIG. 1, a capacitor element 9 was first immersed in a first solution containing 30 g

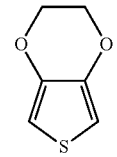

and 2.6 g

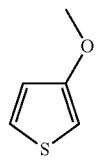

for 5 min, and then immersed in a second solution formed by mixing 100 g tert-butanol solution containing 50% iron (III) p-toluenesulfonate, 20 g polymerizable compound

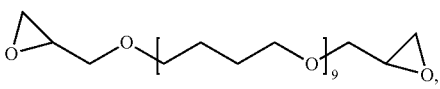

20 g curing agent

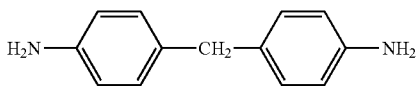

and 2 g catalyst

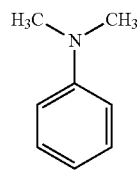

for 5 min. The capacitor element was taken from the electrolytic material formulation, and subjected to heat polymerization at a temperature in the range of 25° C. to 260° C., so as to form a solid electrolyte containing a mixture of a conductive polymer and a polymerizable material.

Example 5

As shown in FIG. 1, a capacitor element 9 was first immersed in a second solution formed by mixing 100 g ethanol solution containing 55% iron (III) p-toluenesulphonate, 20 g polymerizable compound

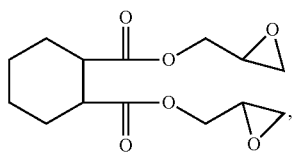 [SMILES: O=C(OCC1CO1)C1CCCCC1C(=O)OCC1CO1]

20 g curing agent

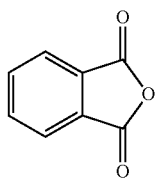

and 2 g catalyst

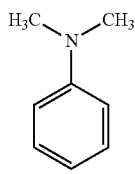

for 5 min, and then immersed in a first solution containing 30 g

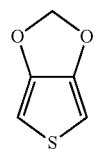

and 5.3 g

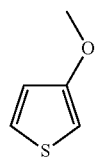

for 5 min. Then, the capacitor element was taken from the electrolytic material formulation, and subjected to heat polymerization at a temperature in the range of 25° C. to 260° C., so as to form a solid electrolyte containing a mixture of a conductive polymer and a polymerizable material.

Example 6

As shown in FIG. 1, a capacitor element 9 was immersed in an electrolyte material formulation formed by mixing 40 g

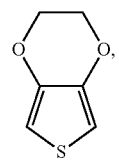

5.3 g

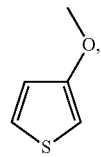

120 g propanol solution containing 40% iron (III) p-toluenesulfonate, 50 g polymerizable compound

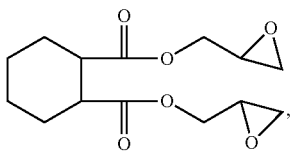 [SMILES: O=C(OCC1CO1)C1CCCCC1C(=O)OCC1CO1]

50 g curing agent

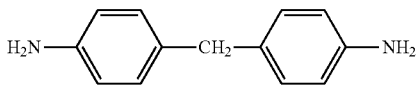 [SMILES: Nc1ccc(Cc2ccc(N)cc2)cc1]

and 5 g catalyst

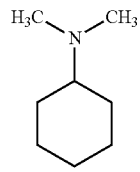

for 5 min. Then, the capacitor element was taken from the electrolytic material formulation, and subjected to heat polymerization at a temperature in the range of 25° C. to 260° C., so as to form a solid electrolyte containing a mixture of a conductive polymer and a polymerizable material.

Example 7

As shown in FIG. 1, a capacitor element 9 was immersed in an electrolyte material formulation formed by mixing 40 g

23

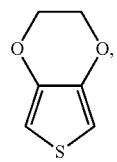

2.6 g

120 g ethanol solution containing 40% iron (III) p-toluene-sulphonate, 40 g polymerizable compound

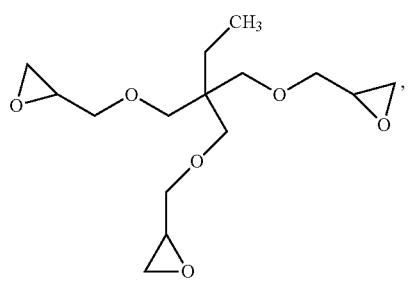 [SMILES: CCC(COCC1CO1)(COCC1CO1)COCC1CO1]

40 g curing agent

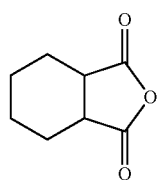

and 5 g catalyst

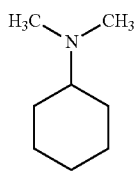

for 5 min. Then, the capacitor element was taken from the electrolytic material formulation, and subjected to heat polymerization at a temperature in the range of 25° C. to 260° C., so as to form a solid electrolyte containing a mixture of polymers of a conductive polymer and a polymerizable material.

Example 8

As shown in FIG. 1, a capacitor element 9 was immersed in an electrolyte material formulation formed by mixing 30 g

24

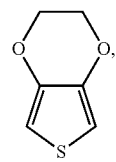

5.3 g

100 g tert-butanol solution containing 40% iron (III) p-toluenesulfonate, 20 g polymerizable compound

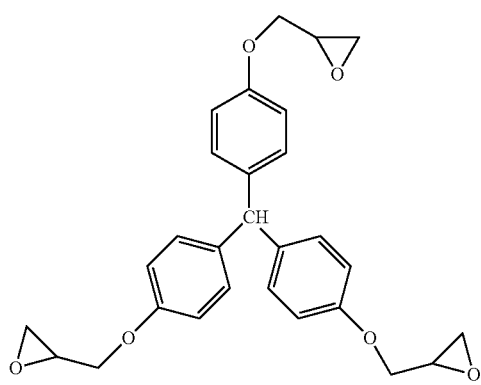 [SMILES: c1cc(C(c2ccc(OCC3CO3)cc2)c2ccc(OCC3CO3)cc2)ccc1OCC1CO1]

and 20 g curing agent

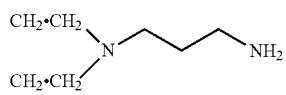

for 5 min. Then, the capacitor element was taken from the electrolytic material formulation, and subjected to heat polymerization at a temperature in the range of 25° C. to 260° C., so as to form a solid electrolyte containing a mixture of a conductive polymer and a polymerizable material.

Example 9

As shown in FIG. 1, a capacitor element 9 was first immersed in a first solution formed by mixing 7.9 g 95% ethanol diluted

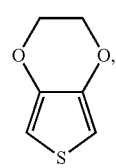

30 g

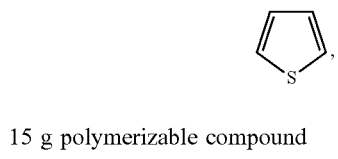

15 g polymerizable compound

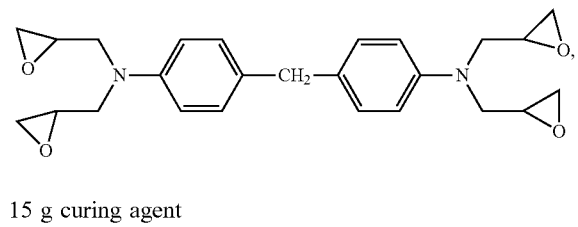

15 g curing agent

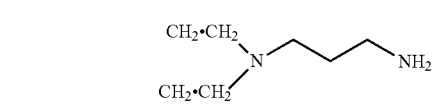

and 2 g catalyst

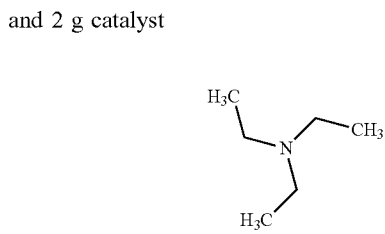

for 5 min, and then immersed in a second solution of 100 g n-butanol solution containing 45% iron (III) p-toluenesulphonate for 5 min. Then, the capacitor element was taken from the electrolytic material formulation, and subjected to heat polymerization at a temperature in the range of 25° C. to 260° C., so as to form a solid electrolyte containing a mixture of a conductive polymer and a polymerizable material.

Example 10

As shown in FIG. 1, a capacitor element 9 was immersed in an electrolyte material formulation formed by mixing 30 g

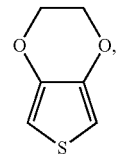

2.6 g

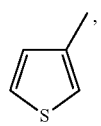

150 g tert-butanol solution containing 40% iron (III) p-toluenesulfonate, 20 g polymerizable compound

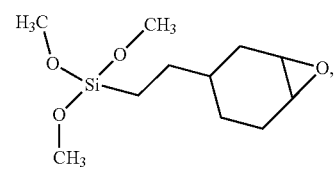

20 g curing agent

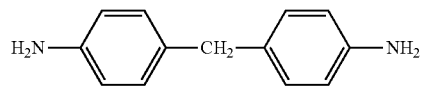 [SMILES: Nc1ccc(Cc2ccc(N)cc2)cc1]

and 2 g catalyst

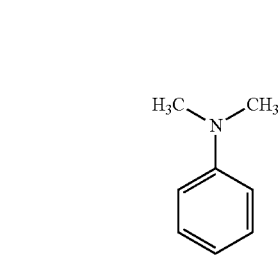

for 5 min. Then, the capacitor element was taken from the electrolytic material formulation, and subjected to heat polymerization at a temperature in the range of 25° C. to 260° C., so as to form a solid electrolyte containing a mixture of a conductive polymer and a polymerizable material.

Example 11

As shown in FIG. 1, a capacitor element 9 was immersed in an electrolyte material formulation formed by mixing 30 g

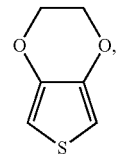

5.3 g

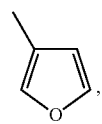

150 g tert-butanol solution containing 40% iron (III) p-toluenesulfonate, 20 g polymerizable compound

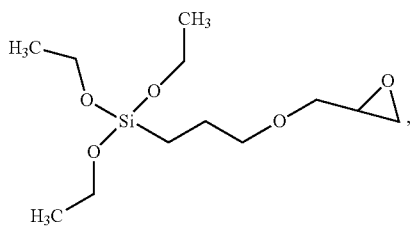 [SMILES: CCO[Si](CCCOCC1CO1)(OCC)OCC]

20 g curing agent

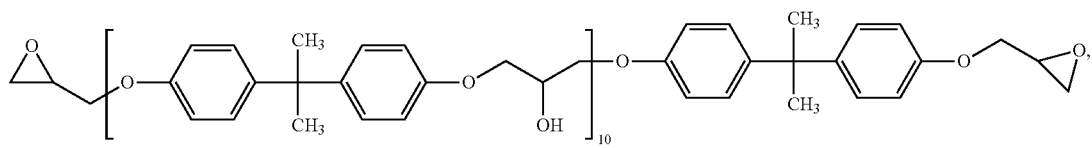

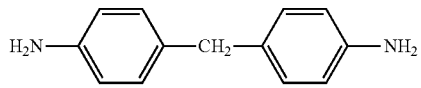 [SMILES: Nc1ccc(Cc2ccc(N)cc2)cc1]

and 2 g catalyst

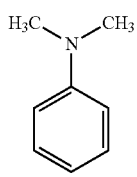

for 5 min. Then, the capacitor element was taken from the electrolytic material formulation, and subjected to heat polymerization at a temperature in the range of 25° C. to 260° C., so as to form a solid electrolyte containing a mixture of a conductive polymer and a polymerizable material.

Example 12

As shown in FIG. 1, a capacitor element 9 was immersed in an electrolyte material formulation formed by mixing 30 g

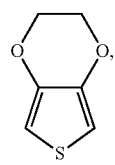

7.9 g

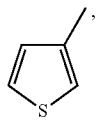

150 g tert-butanol solution containing 40% iron (III) p-toluenesulfonate, 20 g polymerizable compound 15 g curing agent

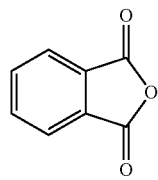 [SMILES: O=C1OC(=O)c2ccccc21]

and 2 g catalyst

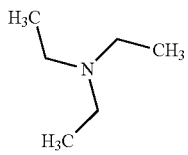

for 5 min. Then, the capacitor element was taken from the electrolytic material formulation, and subjected to heat polymerization at a temperature in the range of 25° C. to 260° C., so as to form a solid electrolyte containing a mixture of a conductive polymer and a polymerizable material.

Example 13

As shown in FIG. 1, a capacitor element 9 was immersed in an electrolyte material formulation formed by mixing 30 g

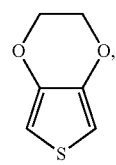

2.6 g

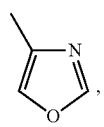

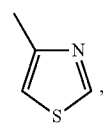

150 g tert-butanol solution containing 40% iron (III) p-toluenesulfonate, 20 g polymerizable compound 150 g tert-butanol solution containing 40% iron (III) p-toluenesulfonate, 20 g polymerizable compound

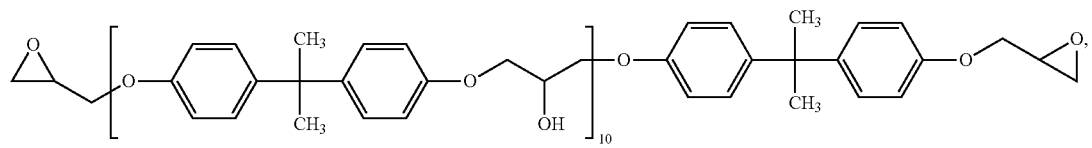

15 g curing agent

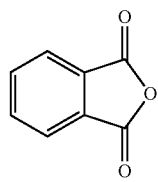

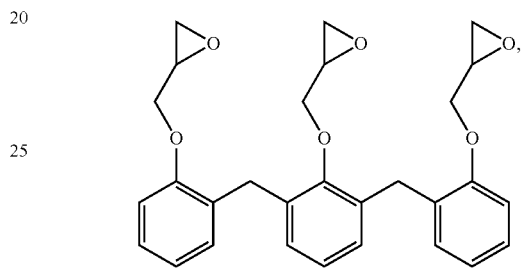

and 2 g catalyst 40 g curing agent

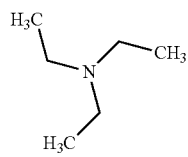

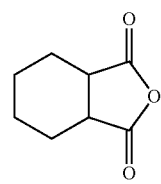 [SMILES: O=C1OC(=O)C2CCCCC12]

and 5 g catalyst for 5 min. Then, the capacitor element was taken from the electrolytic material formulation, and subjected to heat polymerization at a temperature in the range of 25° C. to 260° C., so as to form a solid electrolyte containing a mixture of a conductive polymer and a polymerizable material.

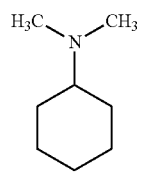

Example 14

As shown in FIG. 1, a capacitor element 9 was immersed in an electrolyte material formulation formed by mixing 30 g

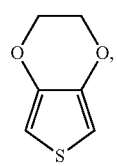

5.3 g for 5 min. Then, the capacitor element was taken from the electrolytic material formulation, and subjected to heat polymerization at a temperature in the range of 25° C. to 260° C., so as to form a solid electrolyte containing a mixture of a conductive polymer and a polymerizable material.

Example 15

As shown in FIG. 1, a capacitor element 9 was immersed in an electrolyte material formulation formed by mixing 7.9 g

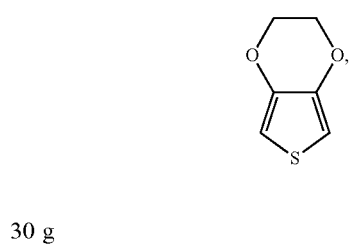

30 g

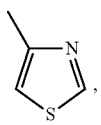

100 g tert-butanol solution containing 40% iron (III) p-toluenesulfonate, 30 g polymerizable compound

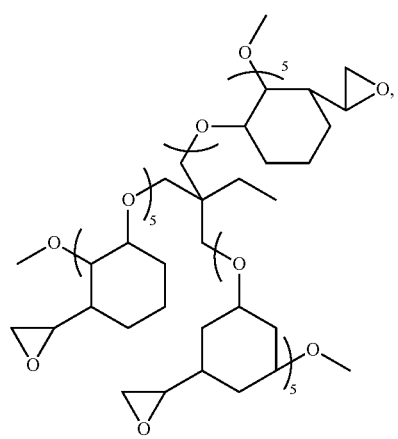

40 g curing agent

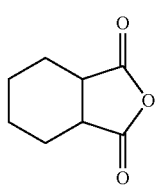

and 3 g catalyst

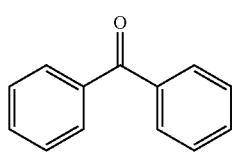 [SMILES: O=C(c1ccccc1)c1ccccc1]

for 5 min. Then, the capacitor element was taken from the electrolytic material formulation, and subjected to heat polymerization at a temperature in the range of 25° C. to 260° C. so as to form a solid electrolyte containing a mixture of a conductive polymer and a polymerizable material.

Example 16

As shown in FIG. 1, a capacitor element 9 was first immersed in a first solution formed by mixing 30 g

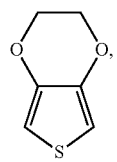

2.6 g

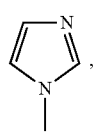

30 g polymerizable compound

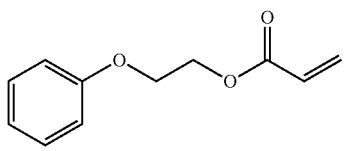

and 3 g catalyst

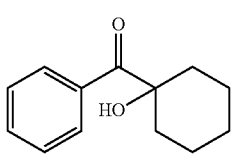 [SMILES: O=C(c1ccccc1)C1(O)CCCCC1]

for 5 min, and then immersed in a second solution of a 100 g tert-butanol solution containing 50% iron (III) p-toluenesulfonate for 5 min. Then, the capacitor element was taken from the electrolytic material formulation, and subjected to heat polymerization at a temperature in the range of 25° C. to 260° C., so as to form a solid electrolyte containing a mixture of a conductive polymer and a polymerizable material.

Example 17

As shown in FIG. 1, the capacitor element 9 was first immersed in a second solution of 100 g tert-butanol solution containing 40% iron (III) p-toluenesulphonate for 5 min, and then immersed in a first solution formed by mixing 30 g

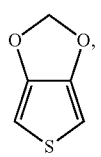

5.3 g

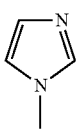

and 30 g polymerizable compound

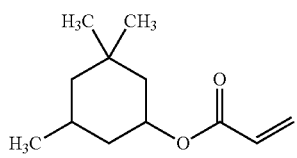

for 5 min. Then, the capacitor element was taken from the electrolytic material formulation, and subjected to heat polymerization at a temperature in the range of 25° C. to 260° C., so as to form a solid electrolyte containing a mixture of a conductive polymer and a polymerizable material.

Example 18

As shown in FIG. 1, a capacitor element 9 was first immersed in a first solution containing 30 g

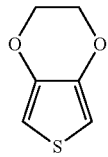

and 7.9 g

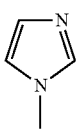

for 5 min, and then immersed in a second solution formed by mixing 100 g tert-butanol solution containing 40% iron (III) p-toluenesulfonate, 25 g polymerizable compound

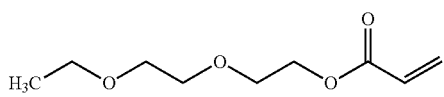

and 3 g catalyst

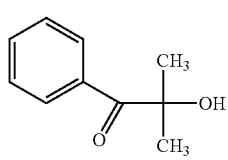

for 5 min. Then, the capacitor element was taken from the electrolytic material formulation, and subjected to heat polymerization at a temperature in the range of 25° C. to 260° C., so as to form a solid electrolyte containing a mixture of a conductive polymer and a polymerizable material.

Example 19

As shown in FIG. 1, a capacitor element 9 was first immersed in a second solution formed by mixing 100 g tert-butanol solution containing 40% iron (III) p-toluenesulphonate and 30 g polymerizable compound

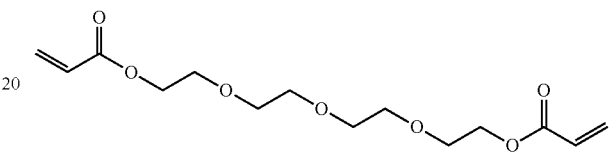

for 5 min, and then immersed in a first solution containing 2.6 g

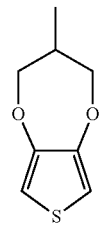

and 30 g

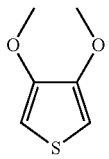

for 5 min. Then, the capacitor element was taken from the electrolytic material formulation, and subjected to heat polymerization at a temperature in the range of 25° C. to 260° C., so as to form a solid electrolyte containing a mixture of a conductive polymer and a polymerizable material.

Example 20

As shown in FIG. 1, a capacitor element 9 was immersed in an electrolyte material formulation formed by mixing 50 g

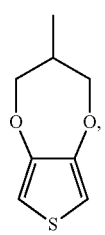

5.3 g

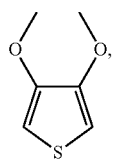

150 g tert-butanol solution containing 40% iron (III) p-toluenesulfonate, 30 g polymerizable compound

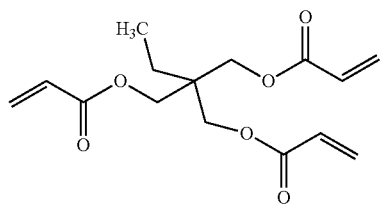 [SMILES: C=CC(=O)OCC(CC)(COC(=O)C=C)COC(=O)C=C]

and 3 g catalyst

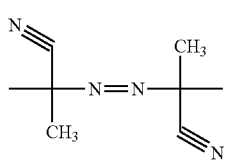

for 5 min. Then, the capacitor element was taken from the electrolytic material formulation, and subjected to heat polymerization at a temperature in the range of 25° C. to 260° C., so as to form a solid electrolyte containing a mixture of a conductive polymer and a polymerizable material.

Example 21

As shown in FIG. 1, a capacitor element 9 was immersed in an electrolyte material formulation formed by mixing 50 g

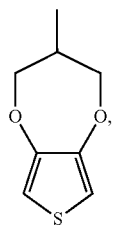

7.9 g

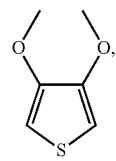

150 g tert-butanol solution containing 40% iron (III) p-toluenesulfonate, 30 g polymerizable compound

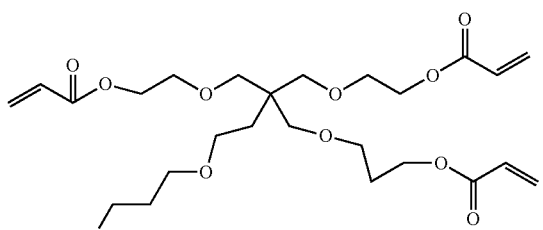

and 3 g catalyst

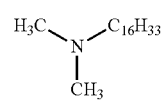

for 5 min. Then, the capacitor element was taken from the electrolytic material formulation, and subjected to heat polymerization at a temperature in the range of 25° C. to 260° C., so as to form a solid electrolyte containing a mixture of a conductive polymer and a polymerizable material.

Example 22

As shown in FIG. 1, a capacitor element 9 was immersed in an electrolyte material formulation formed by mixing 50 g

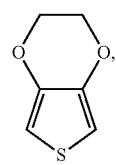

7.9 g

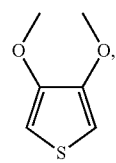

150 g tert-butanol solution containing 40% iron (I) p-toluenesulfonate, 30 g polymerizable compound

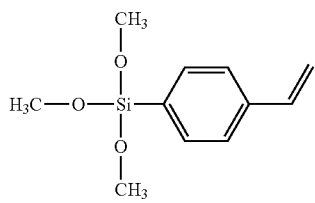

and 3 g catalyst

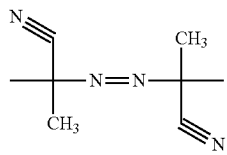

for 5 min. Then, the capacitor element was taken from the electrolytic material formulation, and subjected to heat polymerization at a temperature in the range of 25° C. to 260° C., so as to form a solid electrolyte containing a mixture of a conductive polymer and a polymerizable material.

Example 23

As shown in FIG. 1, a capacitor element 9 was immersed in an electrolyte material formulation formed by mixing 50 g

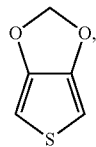

7.9 g

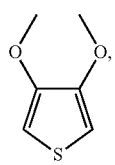

150 g tert-butanol solution containing 40% iron (III) p-toluenesulfonate, 30 g polymerizable compound

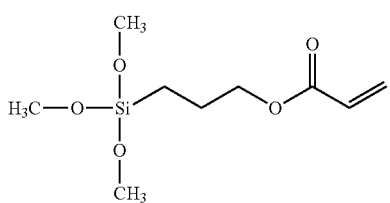

and 3 g catalyst

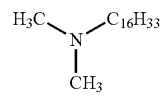

for 5 min. Then, the capacitor element was taken from the electrolytic material formulation, and subjected to heat polymerization at a temperature in the range of 25° C. to 260° C., so as to form a solid electrolyte containing a mixture of a conductive polymer and a polymerizable material.

Example 24

As shown in FIG. 1, a capacitor element 9 was immersed in an electrolyte material formulation formed by mixing 50 g

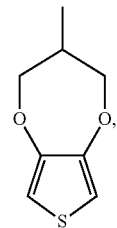

7.9 g

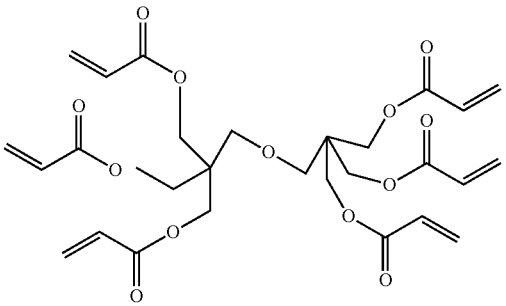

150 g tert-butanol solution containing 40% iron (III) p-toluenesulfonate, 30 g polymerizable compound and 3 g catalyst

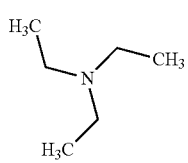

for 5 min. Then, the capacitor element was taken from the electrolytic material formulation, and subjected to heat polymerization at a temperature in the range of 25° C. to 260° C., so as to form a solid electrolyte containing a mixture of a conductive polymer and a polymerizable material.

Example 25

As shown in FIG. 1, a capacitor element 9 was immersed in an electrolyte material formulation formed by mixing 50 g

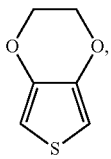

7.9 g

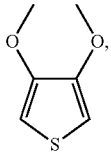

150 g tert-butanol solution containing 40% iron (I) p-toluenesulfonate, 30 g polymerizable compound

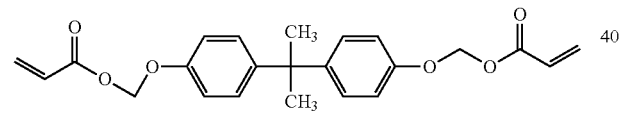

and 3 g catalyst

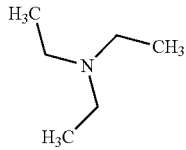

for 5 min. Then, the capacitor element was taken from the electrolytic material formulation, and subjected to heat polymerization at a temperature in the range of 25° C. to 260° C., so as to form a solid electrolyte containing a mixture of a conductive polymer and a polymerizable material.

Comparative Example 1

A capacitor element 9 shown in FIG. 1 was immersed in an electrolyte material formulation formed by mixing 10 g

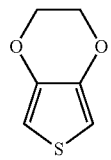

and 100 g tert-butanol solution containing 40% iron (III) p-toluenesulphonate for 5 min. Then, the capacitor element was taken from the electrolytic material formulation, and subjected to heat polymerization at a temperature in the range of 25° C. to 260° C., to form a solid electrolyte.

Preparation of Solid Capacitor and Electrical Property Test

The capacitor elements having the solid electrolytes prepared according to Examples 1 to 25 and Comparative Example 1 were disposed in boxes with a bottom, and the boxes were sealed with a seal element formed by an elastic substance with wires exposed, thus forming solid capacitors.

The resulting solid capacitors were tested by the devices and methods described below.

Determination of Capacitance:

The solid capacitors were tested by HP4284A LCR meter at a temperature of 20° C. and a frequency of 120 Hz.

Determination of Withstand Voltages:

The solid capacitors were tested by Capacitor Leakage Current/IR Meter Chroma Model 11200.

TABLE 1

|  | Capacitance for Storage (CS) (μF, 120 Hz) | Withstand Voltage |
|---|---|---|
| Example 1 | 104 | 66 |
| Example 2 | 103 | 79 |
| Example 3 | 98 | 87 |
| Example 4 | 97 | 67 |
| Example 5 | 96 | 71 |
| Example 6 | 95 | 72 |
| Example 7 | 103 | 70 |
| Example 8 | 108 | 71 |
| Example 9 | 105 | 90 |
| Example 10 | 106 | 74 |
| Example 11 | 103 | 76 |
| Example 12 | 104 | 84 |
| Example 13 | 98 | 72 |
| Example 14 | 103 | 79 |
| Example 15 | 100 | 83 |
| Example 16 | 100 | 66 |
| Example 17 | 97 | 81 |
| Example 18 | 99 | 91 |
| Example 19 | 107 | 79 |
| Example 20 | 101 | 81 |
| Example 21 | 105 | 84 |
| Example 22 | 98 | 82 |
| Example 23 | 102 | 81 |
| Example 24 | 97 | 86 |
| Example 25 | 104 | 84 |
| Comparative Example 1 | 92 | 51 |

It is conceivable to persons having ordinary skill in the art from the above-described examples that various modifications based on the present invention are feasible and can be expected.

The invention claimed is:
1. An electrolyte material formulation, comprising:
(a) a monomer of formula (I):

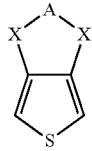
(I)

(b) a monomer selected from the group consisting of:

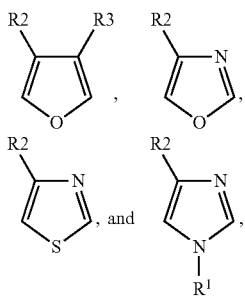

and
a combination thereof, wherein R1, R2, and R3 each independently represent H or $C_{1-3}$ alkyl or alkoxy;
(c) a polymerizable compound selected from the group consisting of:

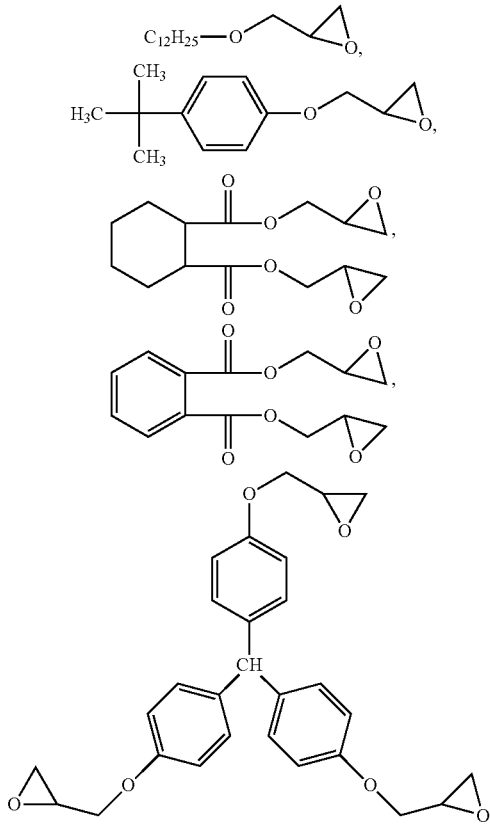

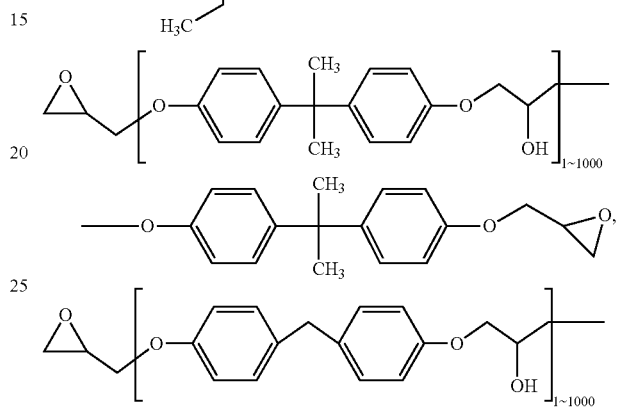

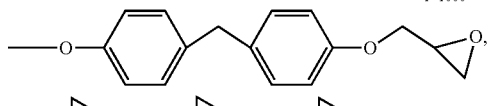

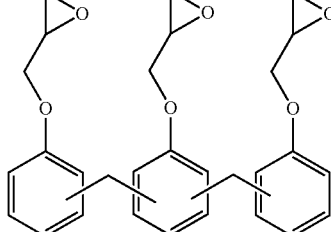

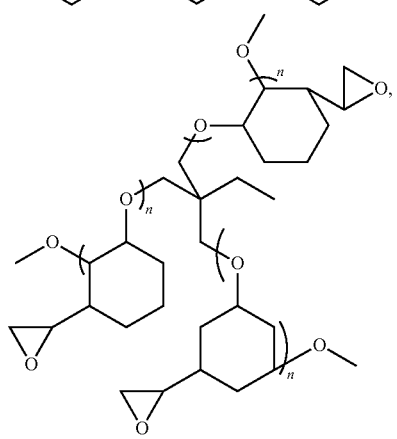

and a combination thereof;
(d) a curing agent which is an amine or an acid anhydride, and
(e) an oxidant selected from the group consisting of alkali metal persulfates, ammonium salts, peroxides, ferric salts of organic acids and a combination thereof;

wherein:
A is a $C_{1-4}$ alkylene substituted by $(Rx)_p$:
X is O or S;
R1, R2, R3 and Rx are independently H, unsubstituted or substituted $C_{1-20}$ alkyl or alkoxy, or unsubstituted or substituted $C_{6-20}$ aryl;
p is an integer from 0 to 2; and
where n is an integer greater than or equal to 3, and
wherein the monomer (b) is in an amount of about 5 parts by weight to about 800 parts by weight and the polymerizable compound (c) is in an amount of about 1 part by weight to about 10000 parts by weight based on 100 parts by weight of the monomer (a).

2. The electrolyte material formulation according to claim 1, wherein the monomer (a) is selected from the group consisting of:

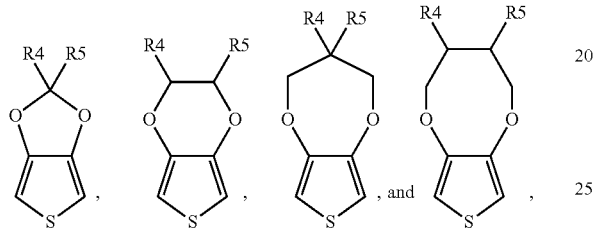

wherein R4 and R5 each independently represent H, unsubstituted or substituted $C_{1-15}$ alkyl or alkoxy, or unsubstituted or substituted $C_{6-15}$ aryl.

3. The electrolyte material formulation according to claim 1, wherein the polymerizable compound has a molecular weight in the range from 40 to 1,000,000.

4. The electrolyte material formulation according to claim 1, wherein based on 100 parts by weight of the monomer (a), the amount of the monomer (b) is about 5 parts by weight to about 400 parts by weight, and the amount of the polymerizable compound (c) is about 5 parts by weight to about 5000 parts by weight.

5. The electrolyte material formulation according to claim 1, wherein based on 100 parts by weight of the total amounts of the monomer (a) and the monomer (b), the amount of the oxidant is about 5 parts by weight to about 3000 parts by weight.

6. The electrolyte material formulation according to claim 1, wherein the curing agent (d) is

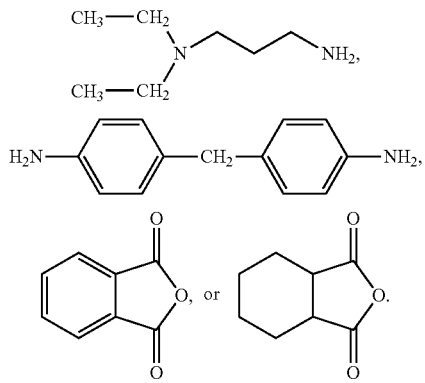

* * * * *